(12) United States Patent
Zimmerman

(10) Patent No.: US 12,442,407 B2
(45) Date of Patent: Oct. 14, 2025

(54) QUICK RELEASE SUCTION MOUNTING APPARATUS WITH LONGITUDINALLY STABLE, LATERALLY COMPLIANT SUCTION CONTROL VALVE SEAT

(71) Applicant: Israel Harry Zimmerman, Los Angeles, CA (US)

(72) Inventor: Israel Harry Zimmerman, Los Angeles, CA (US)

( * ) Notice: Subject to any disclaimer, the term of this patent is extended or adjusted under 35 U.S.C. 154(b) by 2 days.

(21) Appl. No.: 18/612,590

(22) Filed: Mar. 21, 2024

(65) Prior Publication Data
US 2025/0297637 A1 Sep. 25, 2025

(51) Int. Cl.
F16B 47/00 (2006.01)

(52) U.S. Cl.
CPC ................... F16B 47/00 (2013.01)

(58) Field of Classification Search
CPC ........................................ F16B 47/00
USPC ... 248/683, 537, 205.5, 205.8, 206.2, 206.3, 248/309.3, 362, 363
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,319,726 A | 5/1943 | Duggan |
| 2,319,727 A | 5/1943 | Duggan |
| 2,542,400 A | 2/1951 | Donofrio |
| 2,565,793 A | 8/1951 | Weismantel |
| 2,601,279 A | 6/1952 | Hacus |
| 2,740,545 A | 4/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |

(Continued)

FOREIGN PATENT DOCUMENTS

| | | |
|---|---|---|
| CN | 1079886 A1 | 12/1993 |
| CN | 203987324 U | 12/2014 |

(Continued)

*Primary Examiner* — Muhammad Ijaz
(74) *Attorney, Agent, or Firm* — Walter W. Duft

(57) ABSTRACT

A quick-release suction mounting apparatus includes a resilient anchor member with a unitary molded base seal, a stem, and a suction port regulated by a specially designed control valve for improved operational performance under dynamic conditions. The device facilitates a suction seal via a flexible tubule of the control valve that conforms to a control valve plunger, maintaining the seal under lateral stress without air leakage. The apparatus is designed for object support and features adjustable components for effective, stable attachment to various surfaces. It is particularly suited for objects requiring temporary, secure positioning with the capability for swift release.

20 Claims, 7 Drawing Sheets

(56) References Cited

U.S. PATENT DOCUMENTS

| | | | |
|---|---|---|---|
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,593,947 A | 6/1986 | Yokum |
| 4,726,553 A | 2/1988 | Wischusen, III |
| 4,756,497 A | 7/1988 | Lan |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,190,332 A | 3/1993 | Nagai |
| 5,192,043 A | 3/1993 | Fa |
| 5,207,076 A | 5/1993 | Sciarrillo |
| 5,213,385 A | 5/1993 | Nagai |
| 5,263,760 A | 11/1993 | Sohol |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin |
| D357,170 S | 4/1995 | Wellsfry |
| 5,413,302 A | 5/1995 | Ferster |
| 5,511,752 A | 4/1996 | Trethewey |
| 5,531,353 A | 7/1996 | Ward et al. |
| 5,651,520 A | 7/1997 | Belokin et al. |
| 5,667,180 A | 9/1997 | Duckworth |
| 5,702,598 A * | 12/1997 | Lemon ............... F01M 1/10 |
| | | 210/303 |
| 5,742,971 A | 4/1998 | Salinger |
| D397,915 S | 9/1998 | McNaughton |
| D400,763 S | 11/1998 | Taylor et al. |
| 5,992,806 A | 11/1999 | Adams |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,604,648 B2 * | 8/2003 | Immerman ........ A47G 19/2261 |
| | | 220/636 |
| 6,648,285 B1 | 11/2003 | Woollen |
| 6,666,420 B1 | 12/2003 | Carnevali |
| 6,745,987 B2 | 6/2004 | Rousselet et al. |
| 6,749,160 B1 | 6/2004 | Richter |
| 6,776,368 B1 | 8/2004 | Duncan et al. |
| 6,895,642 B2 | 5/2005 | Huang |
| 7,090,183 B2 | 8/2006 | Heybl et al. |
| 7,178,771 B2 | 2/2007 | Richter |
| 7,201,285 B2 | 4/2007 | Beggins |
| 7,306,113 B2 | 12/2007 | El-Saden et al. |
| 7,344,114 B2 | 3/2008 | Richter |
| 7,458,541 B1 | 12/2008 | Chang |
| 7,481,329 B2 | 1/2009 | Camp, Jr. |
| 7,726,715 B2 | 6/2010 | Nagasawa et al. |
| 7,950,422 B2 | 5/2011 | Perlman |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,534,633 B2 | 9/2013 | Tell |
| 8,560,031 B2 | 10/2013 | Barnett |
| 8,757,418 B2 | 6/2014 | Zimmerman |
| 9,494,184 B1 | 11/2016 | Lee |
| 9,521,919 B1 | 12/2016 | Reyes |
| 9,651,229 B1 | 5/2017 | Huang |
| 9,746,022 B2 | 8/2017 | Shi |
| 9,801,483 B2 | 10/2017 | D'Alesio |
| 9,803,682 B1 | 10/2017 | Chang |
| 9,814,332 B2 | 11/2017 | Zimmerman |
| 10,520,009 B2 | 12/2019 | Smith et al. |
| 10,753,384 B1 | 8/2020 | Chang |
| 10,774,870 B2 | 9/2020 | Kang |
| 11,255,482 B1 | 2/2022 | Zimmerman |
| 11,415,266 B2 * | 8/2022 | Zimmerman ........... F16B 47/00 |
| 11,525,475 B2 | 12/2022 | Zimmerman |
| 11,542,980 B2 * | 1/2023 | Zimmerman ........... F16B 47/00 |
| 11,552,998 B2 | 1/2023 | Haid et al. |
| 11,686,431 B1 * | 6/2023 | Lin .............. F16M 11/14 |
| | | 248/205.5 |
| 11,930,906 B2 * | 3/2024 | Boyle ............... A45D 29/007 |
| 11,988,242 B2 * | 5/2024 | Zimmerman ........... F16B 47/00 |
| 2002/0130133 A1 * | 9/2002 | Immerman ........ A47G 19/2255 |
| | | 220/630 |
| 2003/0075666 A1 | 4/2003 | Dunchock |
| 2003/0102320 A1 | 6/2003 | Park |
| 2004/0178315 A1 | 9/2004 | Lee |
| 2004/0238541 A1 | 12/2004 | Camp, Jr. |
| 2004/0238542 A1 | 12/2004 | Camp, Jr. et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2010/0155550 A1 | 6/2010 | Weiss-Vons |
| 2012/0287560 A1 | 11/2012 | Fan |
| 2012/0329534 A1 | 12/2012 | Barnett et al. |
| 2014/0171157 A1 | 6/2014 | Ho |
| 2014/0326630 A1 | 11/2014 | Henry |
| 2015/0230638 A1 | 8/2015 | Jagger |
| 2016/0258471 A1 | 9/2016 | Orban |
| 2018/0149302 A1 | 5/2018 | Papapanos |
| 2019/0022874 A1 | 1/2019 | Mutch et al. |
| 2019/0024699 A1 * | 1/2019 | Mutch .............. A47G 19/10 |
| 2019/0203759 A1 | 7/2019 | Zimmerman |
| 2020/0232501 A1 | 7/2020 | McClean et al. |
| 2020/0400267 A1 | 12/2020 | Garza |
| 2021/0207647 A1 | 7/2021 | Liao |
| 2022/0381288 A1 | 12/2022 | Chen |
| 2023/0091926 A1 | 3/2023 | Zimmerman |
| 2023/0228290 A1 | 7/2023 | Hughes et al. |
| 2023/0228373 A1 | 7/2023 | Hughes et al. |
| 2023/0304527 A1 * | 9/2023 | Zimmerman ........... F16B 47/00 |
| 2024/0102510 A1 * | 3/2024 | Woo ................ F16B 47/00 |
| 2024/0110634 A1 * | 4/2024 | Zimmerman ........ F16M 13/022 |
| 2024/0191835 A1 | 6/2024 | Zimmerman |
| 2024/0418313 A1 * | 12/2024 | Zimmerman ........ F16M 13/022 |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |
| CN | 105996687 A | 10/2016 |
| CN | 106438659 A | 2/2017 |

(56) References Cited

FOREIGN PATENT DOCUMENTS

| | | |
|---|---|---|
| CN | 206060860 U | 3/2017 |
| CN | 207334187 U | 5/2018 |
| DE | 3742636 | 1/1989 |
| EP | 1649788 | 4/2006 |
| GB | 1534235 A | 11/1978 |
| JP | S4929371 U | 3/1974 |
| JP | H05187430 A | 7/1993 |
| JP | H0685924 U | 12/1994 |
| JP | 2000104724 A | 4/2000 |
| JP | 2003501315 | 1/2003 |
| JP | 2004160079 | 10/2004 |
| JP | 2006314739 | 11/2006 |
| JP | 2014173709 A | 9/2014 |
| KR | 20210104241 A | 8/2021 |
| WO | WO2012008942 | 1/2012 |
| WO | WO2019097212 A1 | 5/2019 |

\* cited by examiner

QUICK RELEASE SUCTION MOUNTING APPARATUS WITH LONGITUDINALLY STABLE, LATERALLY COMPLIANT SUCTION CONTROL VALVE SEAT

BACKGROUND

Field

The present invention relates to the field of suction-based attachment devices, focusing on a quick-release suction mounting apparatus designed for temporary attachment to various types of surfaces with an enhanced, reliable suction mechanism.

Description of the Prior Art

The background of the technological advancement under consideration emanates from an enduring necessity to affix objects temporarily to various surfaces. Historically, the utilization of suction mounting mechanisms has been prevalent, serving as a mechanism to removably secure items to surfaces whether they be positioned horizontally, vertically, or at an angle, without leaving residues or inflicting damage. The core functionality of these devices traditionally hinges on the creation of a partial vacuum facilitated by a base made of pliable material that, upon being pressed against a surface, expels air to initiate suction, thereby maintaining the position of the device.

The operational efficacy of these suction-based devices has often been hampered by their inability to maintain an airtight seal with the adhered surface, especially in scenarios where indirect forces or vibrations are encountered. The advent of such forces or shifts often contributes to the distortion of the suction apparatus, leading to air leakage and a consequential loss of suction. This underscores an ongoing demand for a design that upholds stability and consistency in suction performance, notwithstanding the exposure to unplanned forces or movements.

What is needed is a quick-release suction mounting apparatus that maintains an airtight seal under circumstances of applied force disturbances, vibrations, or impacts, offering a consistent and reliable suction-based adhesion that mitigates the limitations observed in prior art.

SUMMARY

A quick-release suction mounting apparatus includes an anchor member made from a resilient non-porous material forming a unitary molded article with a base seal member, a stem and a suction port that is opened and closed by a control valve. The base seal member includes a first side for adherence to a mounting surface and a second side from which the stem emerges. The suction port includes an air vent extending through the anchor member from a free end of the stem to the first side of the base seal member. The control valve includes a control valve seat defined at the free end of the stem, the control valve seat being formed by a flexible tubule having a base, a distal tip, and an inner bore providing a free end portion of the suction port. An object-carrying assembly includes a first auxiliary component affixed to the anchor member and a second auxiliary component arranged for linear sliding relative to the first auxiliary component. The control valve further includes a control valve plunger on the second auxiliary component configured for releasable sealable engagement with the control valve seat, wherein the control valve plunger penetrates into the flexible tubule's inner bore with an interference fit to block the air vent and thereby create a suction seal between the first side of the base seal member and the mounting surface. The flexible tubule has longitudinal stability sufficient to resist collapse, sagging and other longitudinal deformations that would, if present, prevent the control valve plunger from penetrating with the interference fit into the flexible tubule's inner bore. The flexible tubule has lateral compliance sufficient to accommodate lateral movement of the control valve plunger and maintain the suction seal under lateral forces acting on the second auxiliary component without air leakage past the control valve plunger when it penetrates into the flexible tubule's inner bore.

DETAILED DESCRIPTION

Figure 1:
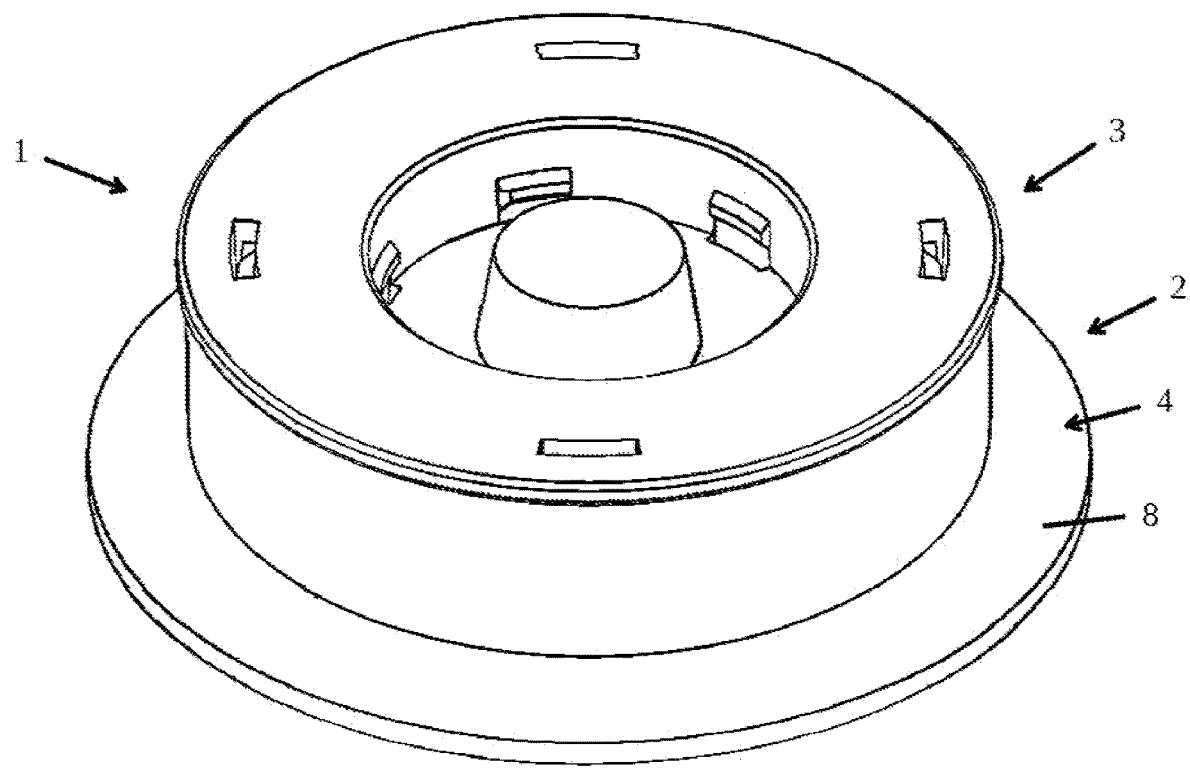
FIG. 1 is an upper perspective view of a quick-release suction mounting apparatus according to an example embodiment thereof.
Figure 2:
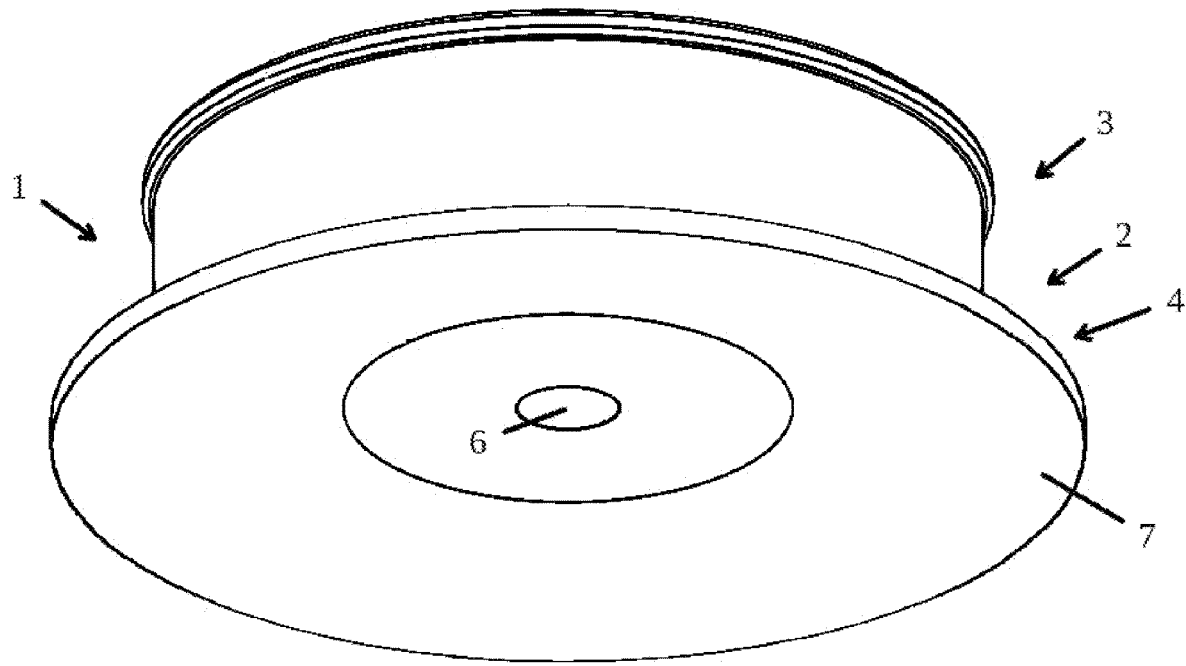
FIG. 2 is a lower perspective view of the quick-release suction mounting apparatus of FIG. 1.

Turning now to the drawing figures, FIGS. 1 and 2 show respective upper and lower perspective views of a quick-release suction mounting apparatus 1 according to one example embodiment. The apparatus 1 includes an anchor member 2 and an object-carrying assembly 3 mounted thereto.

Figure 3:
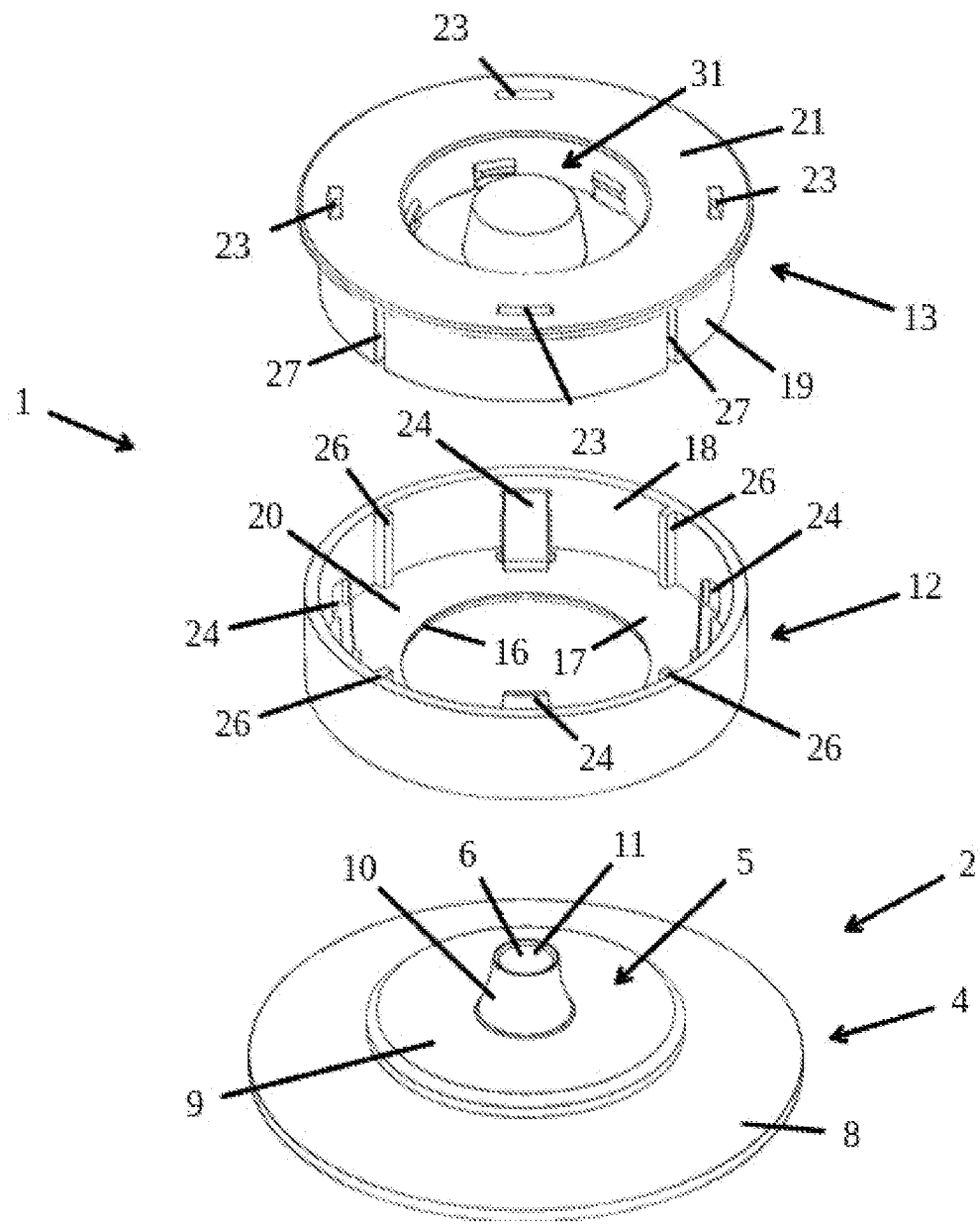
FIG. 3 is an exploded upper perspective view of the quick-release suction mounting apparatus of FIG. 1.
Figure 4:
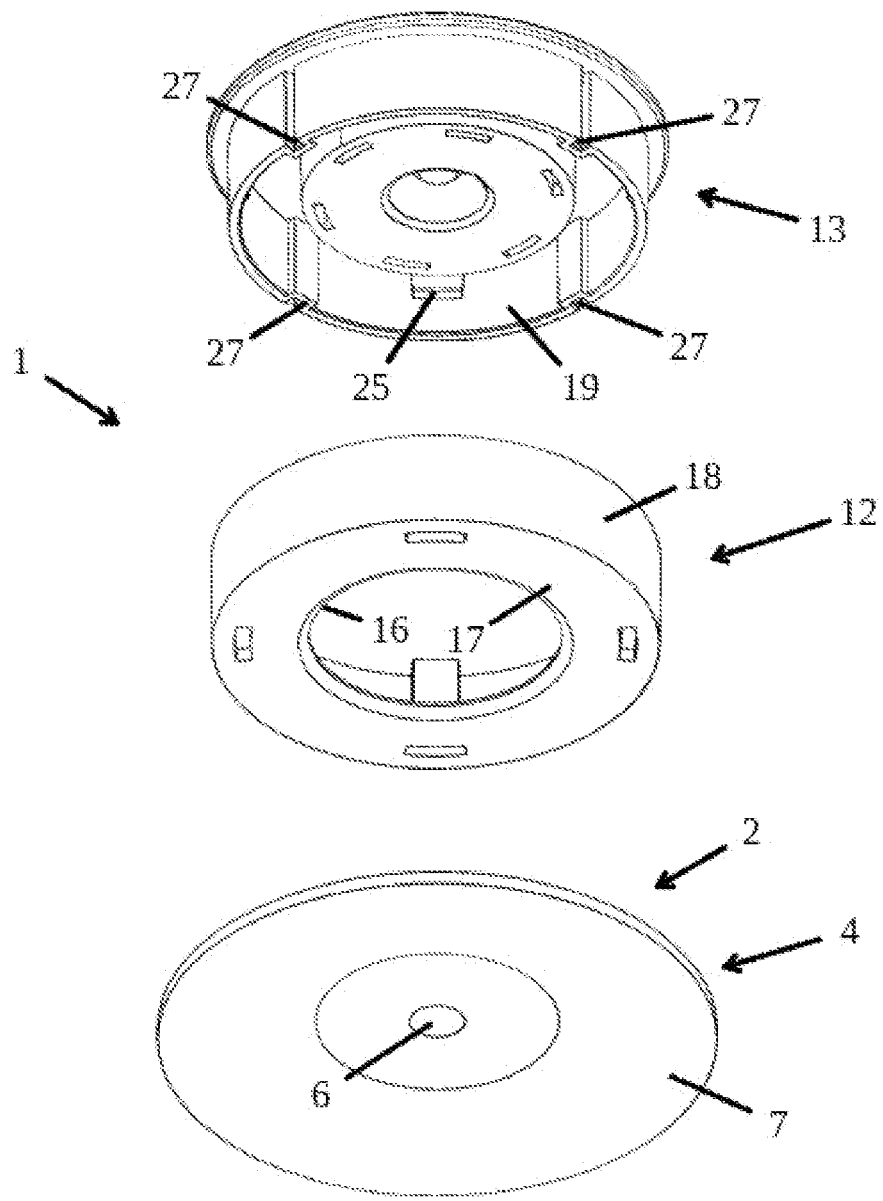
FIG. 4 is an exploded lower perspective view of the quick-release suction mounting apparatus of FIG. 1.

With additional reference now to FIGS. 3 and 4, the anchor member 2 may be formed as a unitary molded article made from silicone rubber or other material of suitable flexibility and resilience. By way of example only, In the illustrated embodiment of FIGS. 1-4, silicone rubber having a durometer hardness of between Shore 20 A-80 A, and more preferably 40 A-60 A, is used. The anchor member 2 includes a base seal member 4, a stem 5 and a suction port 6 that is opened and closed by a control valve (described in more detail below).

The base seal member 4 includes a lower first side 7 (see FIGS. 2 and 4) for adherence to a mounting surface (not shown) and an upper second side 8 (see FIGS. 1 and 3) from which the stem 5 emerges. The base seal member's flexibility and elasticity enable it to create an effective suction grip with the mounting surface.

The base seal member 4 may be formed like a traditional suction cup wherein downward flexing and a rebound effect creates and maintains an initial suction force. Alternatively, the base seal member 4 may be formed as a suction seal stabilizer that initially engages the mounting surface with little or no suction force, but wherein suction is generated thereafter when the base seal member is flexed away from the surface. Suction seal stabilizers are disclosed, for example, in U.S. Pat. Nos. 11,255,482, 11,415,266 and 11,542,980 of Zimmerman.

The suction port 6 extends through the anchor member 2 from an upper free end of the stem 5 to the lower first side 7 of the base seal member 4. Air flow through the suction port 6 is controlled by the aforementioned control valve, which is formed as a two-element valve mechanism that opens and closes during operation of the apparatus 1.

The stem 5 is constructed according to the manner in which the object-carrying assembly 3 is mounted to the anchor member 2. In the illustrated embodiment of FIGS. 1-4, the object-carrying assembly 3 is mounted to the stem 5. As such, a lower portion of the stem 5 is formed as a mounting structure 9 (see FIG. 3) that mounts the object-carrying assembly 3. In other embodiments, such as the one described below in connection with FIGS. 11-12, the object-carrying assembly 3 is not attached to the stem. As such, the stem 5 of that embodiment need not incorporate a mounting structure.

Regardless of whether or not the stem 5 includes the mounting structure 9, some or all of the stem is formed as a flexible tubule 10 whose outer end region defines a control valve seat 11 of the previously-mentioned control valve. In the illustrated embodiment of FIGS. 1-4, the flexible tubule 10 emerges from the top of the mounting structure 9 and extends upwardly therefrom. As described in more detail below in connection with FIGS. 11-12, the flexible tubule (110) of that embodiment emerges from the upper second side 8 of the base seal member 4.

As shown in FIGS. 3-4, the object-carrying assembly 3 includes a first auxiliary component 12 affixed to the anchor member 2 and a second auxiliary component 13 arranged for linear sliding relative to the first auxiliary component. The first auxiliary component 12 and the second auxiliary component 13 may both be formed from a rigid thermoplastic material, as well as other materials. They may be provided as discrete components that are formed independently of each other and thereafter mechanically interconnected during assembly of the apparatus 1.

Figure 5:
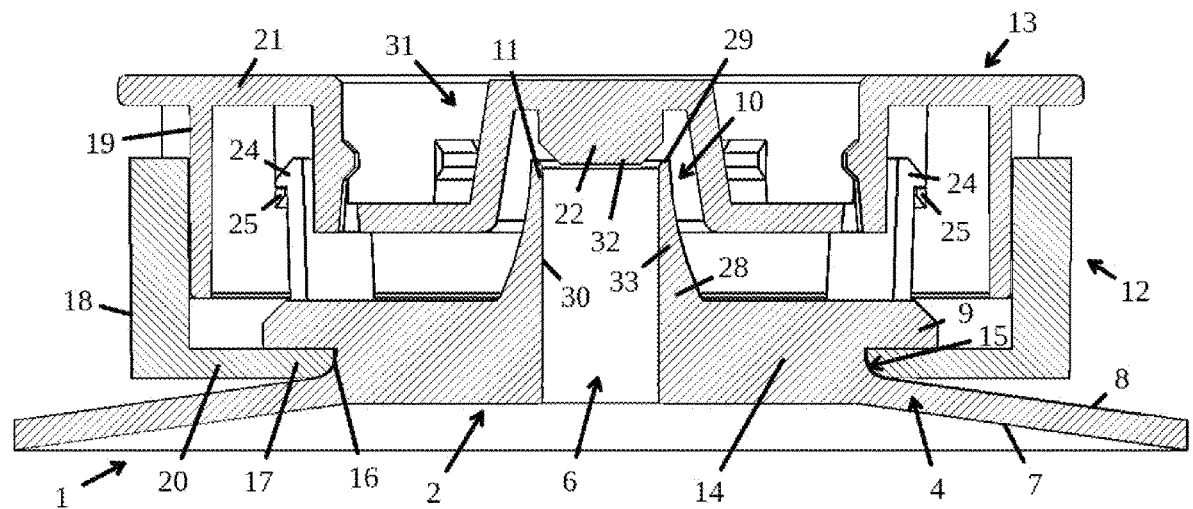
FIG. 5 is a cross-sectional view of the quick-release suction mounting apparatus of FIG. 1 in an unsealed configuration in which a control valve plunger and a control valve seat are disengaged from each other.
Figure 6:
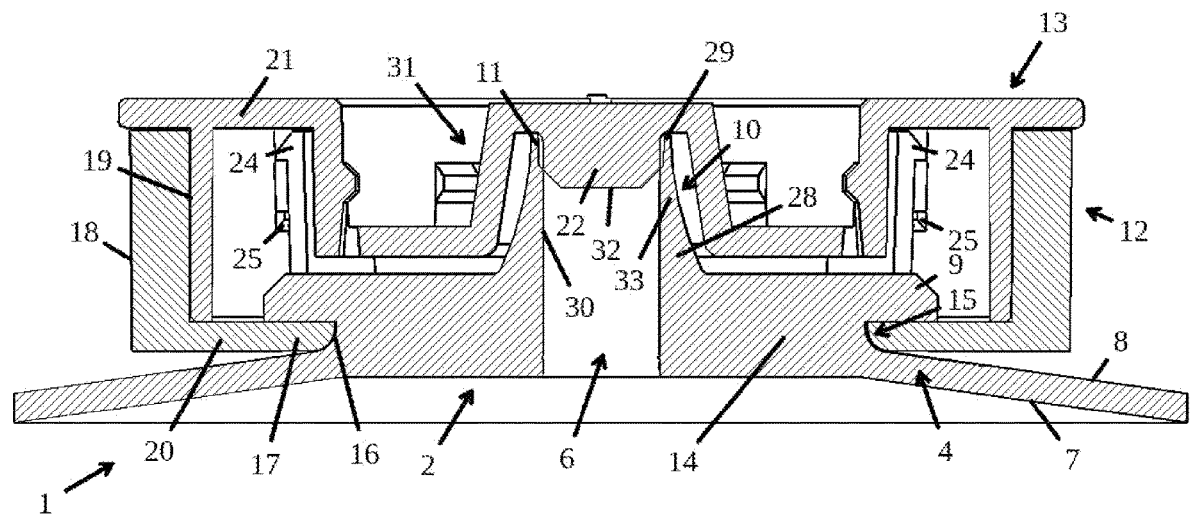
FIG. 6 is a cross-sectional view of the quick-release suction mounting apparatus of FIG. 1 in a sealed configuration in which a control valve plunger and a control valve seat are sealably inter-engaged.

The first auxiliary component 12 is affixed to the mounting structure 9 of the anchor member 2. To secure the first auxiliary component 12, the mounting structure 9 may be formed as a disc-like button that is spaced a short distance from the second side 8 of the base seal member 4. As can be seen in FIGS. 5-6, the mounting structure 9 is joined to the base seal member 4 by a short post 14 of reduced diameter. This arrangement defines an undercut 15 between the bottom of the mounting structure 9 and the upper first side 7 of the base seal member 4. The undercut 15 functions as an annular connection channel that is sized to engage a central opening 16 (best shown in FIG. 3) of the first auxiliary component 12. A perimeter region 17 of the first auxiliary component 12 that surrounds the central opening 16 is sandwiched between the mounting structure 9 and the base seal member 4, allowing the annular connection channel to wrap around the perimeter region to form a rigid attachment. This rigid attachment fixes the first auxiliary component 12 on the anchor member 2 so that it remains substantially immobile when the apparatus 1 is suctioned to a surface.

The second auxiliary component 13 is slidably mounted to the first auxiliary component 12 by way of a nested, inter-engaging wall arrangement provided by a first wall structure 18 of the first auxiliary component 12 that slidably engages a second wall structure 19 of the second auxiliary component 13. The first wall structure 18 extends axially away from a first main body 20 of the first auxiliary component 12, at or near the periphery thereof. The second wall structure 19 extends axially away from a second main body 21 of the second auxiliary component 13, at or near the periphery thereof.

An interior region of the first main body 20 is formed with the aforementioned central opening 16 of the first auxiliary component 12. As described in more detail below, an interior region of the second main body 21 is formed to define, among other things, a control valve plunger 22 of the aforementioned control valve (see FIGS. 4 and 5).

The second main body 21 is also used to mount an object (not shown) to be carried by the apparatus 1, or to mount an object carrier (not shown) that may be used to carry one or more different objects, either with or without attachment to the object holder. The ability to mount an object or an object carrier may be provided by forming slots 23 in, or otherwise configuring, the upper side of the second main body 21, as shown in FIG. 3.

Inadvertent detachment of the second auxiliary component 13 from the first auxiliary component 12 is prevented by an interlock mechanism formed by a set of flexible hooks 24 on the first auxiliary component 12 (see FIG. 3) that engage a set of latches 25 on the second auxiliary component 13 (see FIG. 4). It may also be desirable to prevent inadvertent rotation of the second auxiliary component 13 relative to the first auxiliary component 12. Such rotation could potentially result in loss of suction during use of the apparatus 1. To that end, an anti-rotation mechanism may be provided by a set of axially-oriented ribs 26 formed on interior side of the first wall structure 18 (see FIG. 3) that engage a corresponding set of axially-oriented channels 27 formed on an exterior side of the second wall structure 19 (see FIG. 4).

With reference now to FIGS. 5 and 6, the flexible tubule 10 that forms the control valve seat 11 is designed with a flexible tubule base 28, a distal flexible tubule tip 29, and a flexible tubule inner bore 30 that acts as the terminus (free end portion) of the suction port 6. The control valve seat 11 represents a region (a.k.a. plunger valve engagement region)

of the flexible tubule inner bore 30 that is engaged by the control valve plunger 22. This region is best observed in FIG. 5.

The control valve plunger 22 is a rigid (or substantially rigid) structure that can be integrally formed as part of a central interior structure 31 of the second auxiliary component's second main body 21. In the illustrated embodiment, the central interior structure 31 is a cup-shaped formation that is configured to receive and rotatably mount an object carrier (not shown) for carrying an object to be anchored by the apparatus 1. In other embodiments, the central interior structure 31 could be flat or of any other desired shape.

The control valve plunger 22 is engineered for releasable sealable engagement with the flexible tubule's control valve seat 11. Upon engagement, the control valve plunger 22 penetrates into the flexible tubule inner bore 30 with an interference fit, thereby blocking the suction port 6 to create the necessary suction seal between the lower first side 7 of the base seal member 4 and the mounting surface to which the apparatus 1 attaches.

The operation of the apparatus 1 involves two positions of the second auxiliary component 13. FIG. 5 depicts an open unsealed position of the apparatus 1. In this position, the control valve plunger 22 is retracted from the control valve seat 11 so that the control valve plunger does not penetrate into the flexible tubule inner bore 30. The suction port 6 is unblocked so as to allow air to flow, thereby eliminating the suction grip between the base seal member 4 and the mounting surface, and releasing the apparatus from the surface. FIG. 6 depicts a closed sealing position of the apparatus 1. In this position, the control valve plunger 22 sealably engages the control valve seat 11. The control valve plunger 22 penetrates the flexible tubule inner bore 30 and blocks the suction port 6, creating a partial vacuum between the base seal member 4 and the mounting surface.

As can be seen in FIG. 6, the extent of penetration by the control valve plunger 22 into the flexible tubule inner bore 30 is limited by the second auxiliary component 13 "bottoming out" on the first auxiliary component 12. In the illustrated embodiment, this occurs as a result of engagement between the upper end of the first wall structure 18 and the underside of the second main body 21 and by the second wall structure 19 engaging the first main body 20. The penetration extent may thus be selected by adjusting the height of the first wall structure 18, the height of the second wall structure 18, or both. Other penetration-limiting structures and arrangements may also be used, such as or the central interior structure 31 engaging the mounting structure 9, etc.

It will be appreciated that failure to limit the penetration extent of the control valve plunger 22 may result in difficulty removing the plunger from the control valve seat 11. This can adversely affect a user's experience with the apparatus 1, particularly if "stealthy" operation is desired (described in more detail below). Upward movement of the second auxiliary component 13 (or an object carried thereon) may feel undesirably "sticky" to the user, such that the apparatus 1 feels cumbersome to use. If the penetration extent is too great, it may even be possible to break the suction between the base seal member 4 and the mounting surface without venting the suction port 6, which defeats the purpose of having a control valve. On the other hand, if the penetration extent is too small, it may be difficult or impossible to maintain proper sealing of the suction port 6 during normal use of the apparatus 1.

The control valve plunger 22 can be of various geometries, including tapered or non-tapered configurations with straight, rounded, parallel, or non-parallel sides as required to achieve optimal suction sealing results. In the illustrated embodiment depicted in FIGS. 5-6, the control valve plunger 22 is formed as a downwardly-extending parallel-walled right cylinder with a chamfered tip 32 to guide initial insertion into the flexible tubule inner bore 30. In this embodiment, the flexible tubule inner bore 30 is also parallel-walled, but may be formed with a shallow bevel at the flexible tubule tip 29 (see FIG. 5) that receives the chamfered tip 32.

The design of the flexible tubule 10 is carefully orchestrated to provide a control valve seat 11 possessing the twin properties of longitudinal stability and lateral compliance. As described in more detail below, various design principles may be utilized to achieve these dual goals.

The property of longitudinal stability allows the flexible tubule 10 to resist deformations that may interfere with the achievement of a satisfactory interference fit between the control valve plunger 22 and the control valve seat 11. The longitudinal stability ensures that the flexible tubule 10 maintains its shape and alignment while the control valve plunger 22 inserts into and engages the control valve seat 11 with the required amount of interference. The flexible tubule 10 should be capable of resisting collapse, sagging or other unwanted longitudinal deformations that could adversely impede the ability to introduce the control valve plunger 22 into the flexible tubule inner bore 30 and seal the suction port 6.

The property of lateral compliance means that the flexible tubule 10 is able to adapt to lateral movements of the control valve plunger 22 while maintaining a seal on the suction port 6 without air leakage. Lateral movement of the control valve plunger 22 may result from the fact that the fit between the first auxiliary component 12 and the second auxiliary component 13 may not be entirely precise. For example, there may be a gap between the first wall structure 18 and the second wall structure 19 due to manufacturing tolerances. This gap may allow the second auxiliary component 13 to translate laterally with respect to the first auxiliary component 12, or rotate relative thereto, or both, during use of the apparatus 1. The lateral compliance of the flexible tubule 10 allows for a degree of movement in response to such lateral or rotational misalignment without losing suction due to deformation of the flexible tubule inner bore 30. For example, by providing a proper degree of lateral compliance, the flexible tubule 10 will move laterally with the control valve plunger 22 without the flexible tubule inner bore 30 (at the control valve seat 11) deforming to an elongated out-of-round condition that allows air leakage past the plunger. This ensures that the control valve seat 11 will continue to envelop and grip the control valve plunger 22 securely, even if the plunger is subjected to impacts, vibrations, or other forces, thereby maintaining suction integrity.

FIGS. 7-10 are illustrative. In these Figures, the apparatus 1 is depicted without the first auxiliary component being shown in order to better illustrate the ways in which the second auxiliary component 13 can move.

Figure 7:
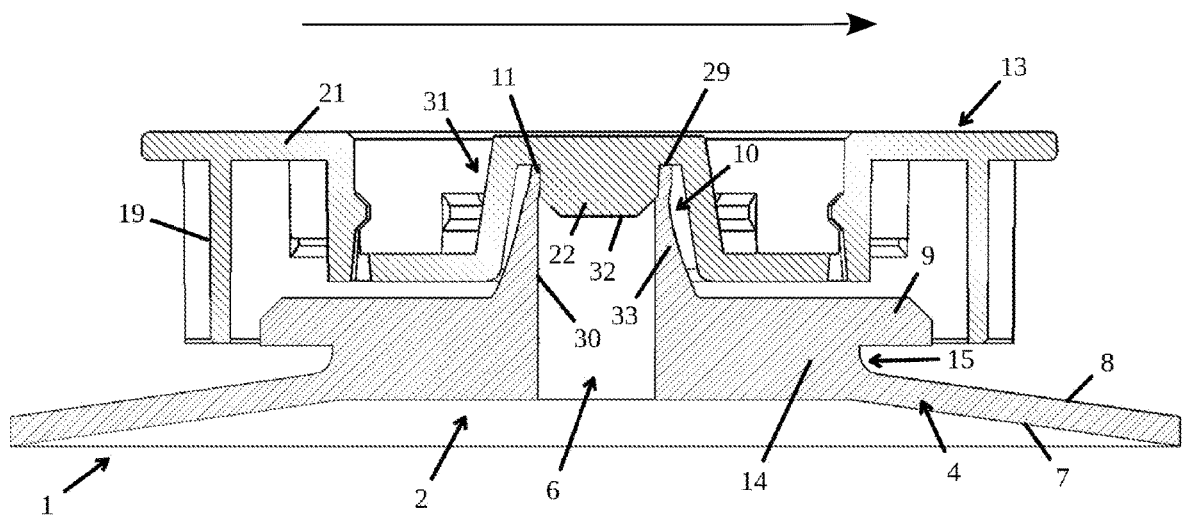
FIG. 7 is a cross-sectional view of the quick-release suction mounting apparatus of FIG. 1 in the sealed configuration of FIG. 6, and illustrating the lateral compliance of a control valve seat in response to lateral movement of the control valve plunger in a rightward direction.
Figure 8:
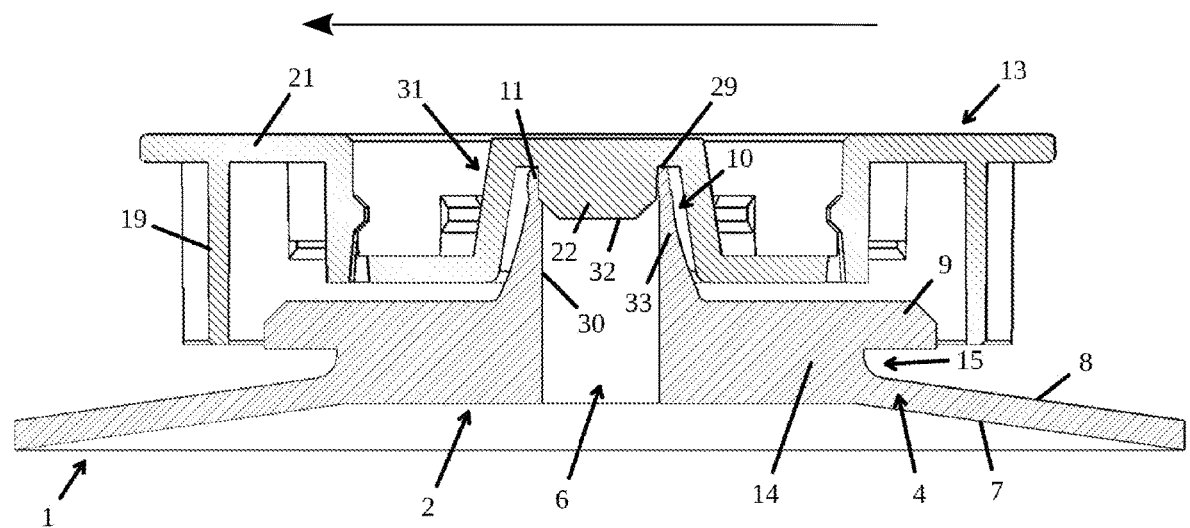
FIG. 8 is a cross-sectional view of the quick-release suction mounting apparatus of FIG. 1 in the sealed configuration of FIG. 6, and illustrating the lateral compliance of a control valve seat in response to lateral movement of the control valve plunger in a leftward direction

FIGS. 7 and 8 illustrate the reaction of the control valve when side loads cause the second auxiliary component 13 to shift right (FIG. 7) or left (FIG. 8). It will be seen that the control valve seat 11 shifts laterally in compliance with the lateral movement of the control valve plunger 22, but without unwanted deformation of the the control valve seat 11 that could result in a loss of sealing contact and air leakage through the suction port 6.

Figure 9:
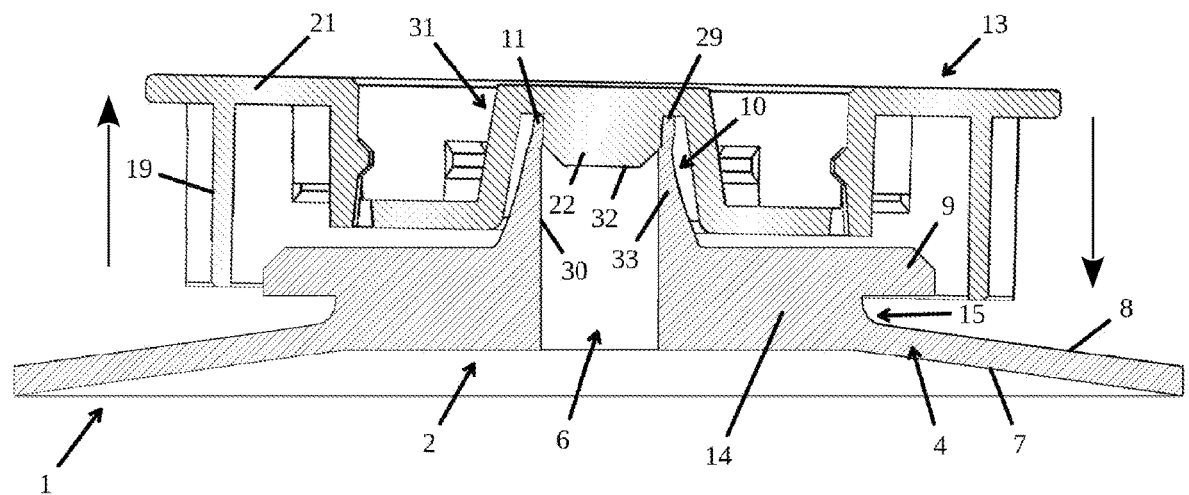
FIG. 9 is a cross-sectional view of the quick-release suction mounting apparatus of FIG. 1 in the sealed configuration of FIG. 6, and illustrating the lateral compliance of a control valve seat in response to rotational movement of the control valve plunger in a clockwise direction.
Figure 10:
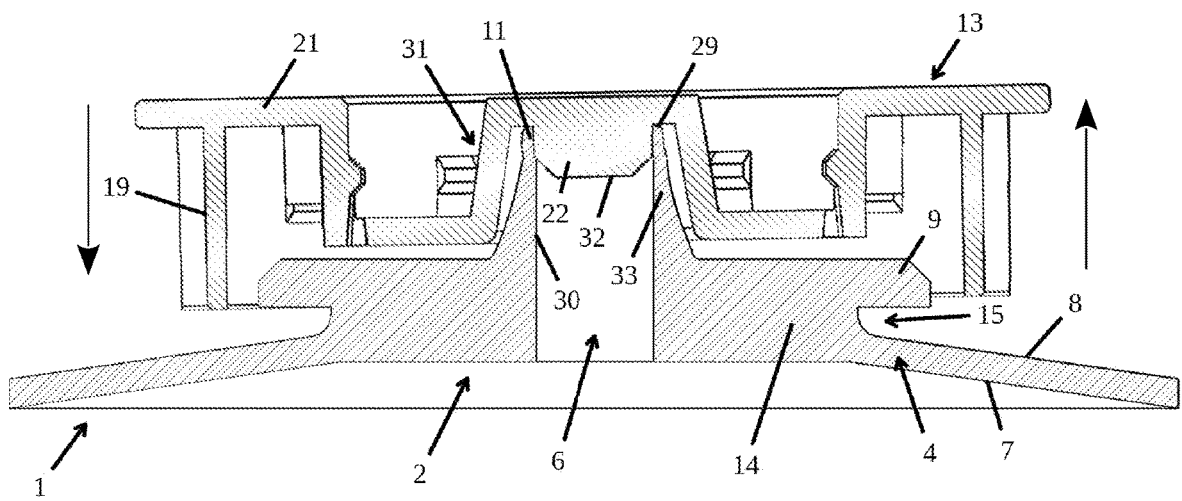
FIG. 10 is a cross-sectional view of the quick-release suction mounting apparatus of FIG. 1 in the sealed configuration of FIG. 6, and illustrating the lateral compliance of a control valve seat in response to rotational movement of the control valve plunger in a counter-clockwise direction.

FIGS. 9 and 10 illustrate the reaction of the control valve when rotational loads cause the second auxiliary component 13 to rotate clockwise (FIG. 9) or counterclockwise (FIG. 10). It will be seen that the control valve seat 11 rotates in compliance with the rotational movement of the control valve plunger 22, but again without unwanted deformation of the control valve seat 11 that could result in a loss of sealing contact and air leakage through the suction port 6.

The flexible tubule 10 may be designed to have both longitudinal stability and lateral compliance using one or more of the following design principles:

Design Principle #1

Design Principle #1 contemplates forming the flexible tubule 10 with a flexible tubule sidewall 33 whose thickness decreases from the flexible tubule base 28 to the control valve seat 11 where the flexible tubule inner bore 30 is penetrated by the control valve plunger 22, such that the base is more rigid than the tip. By way of example only, in the illustrated embodiment of FIGS. 5-6, the sidewall thickness in the region of the control valve seat 11 (i.e., throughout the area of sidewall engagement by the control valve plunger 22) is 25% of the sidewall thickness at the flexible tubule base 28. At the mid-length point between the flexible tubule base 28 and the flexible tubule tip 29, the sidewall thickness is 40% of the sidewall thickness at the flexible tubule base 28. As previously noted, the material used to form the anchor member 2 of the illustrated embodiment is silicone rubber having a durometer hardness of between Shore 20 A-80 A, and more preferably Shore 40 A-60 A.

Figure 11:
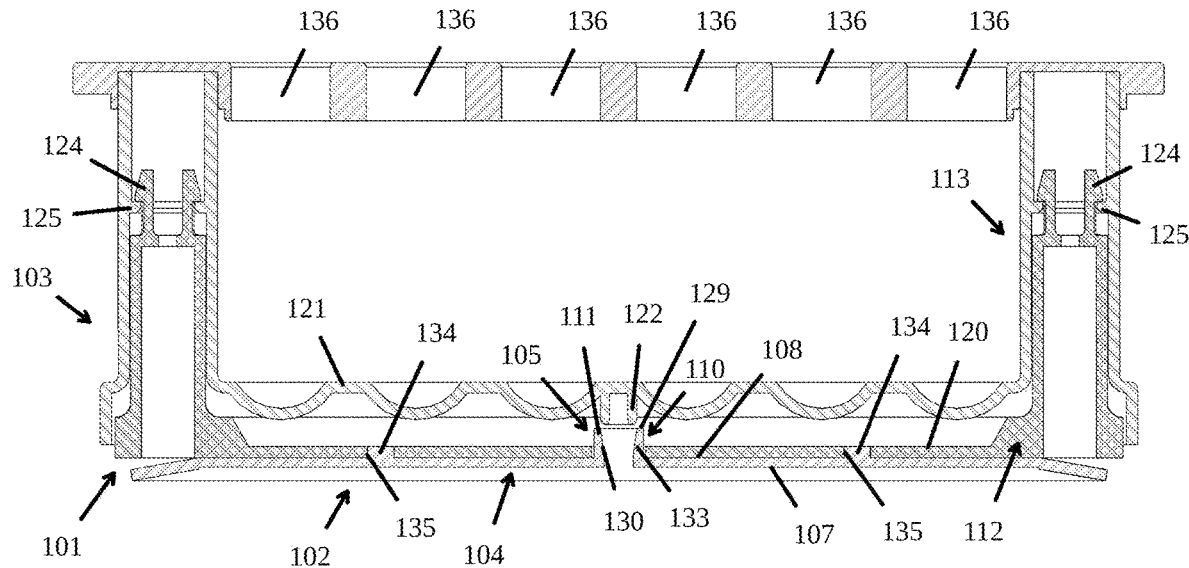
FIG. 11 is a cross-sectional view of a quick-release suction mounting apparatus according to another embodiment, with the apparatus being in an unsealed configuration in which a control valve plunger and a control valve seat are disengaged from each other.
Figure 12:
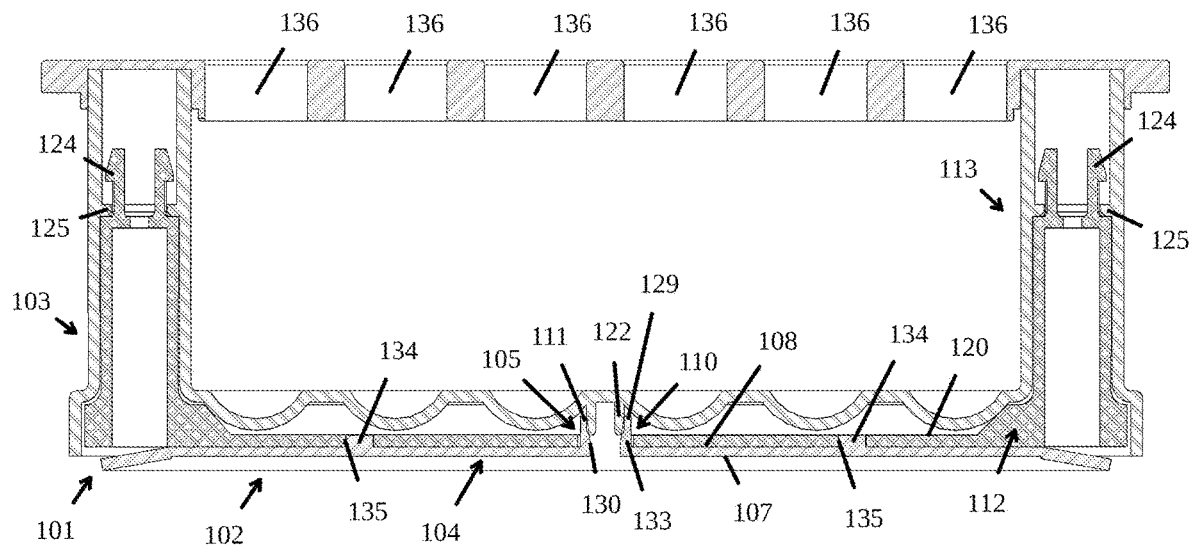
FIG. 12 is a cross-sectional view of a suction mounting apparatus according to another embodiment, with the apparatus being in a sealed configuration in which a control valve plunger and a control valve seat are sealably inter-engaged.

The flexible tubule's wall thickness reduction may be achieved by tapering either the outside surface of the flexible tubule sidewall 33 (as shown in FIGS. 5-6) or the inside surface thereof (as shown in FIGS. 11-12), or both. The sidewall taper may be gradual or achieved using one or more discrete thickness reduction steps.

Design Principle #2

Design Principle #2 contemplates forming the flexible tubule 10 so that the thickness of the flexible tubule sidewall 33 is substantially less than the diameter of the flexible tubule inner bore 30, especially at the control valve seat 11 where the bore is penetrated by the control valve plunger 22. The goal is to maximize the flexible tubule's air-vent-diameter-to-tubule-wall-thickness ratio to the greatest extent possible without losing longitudinal stability. By way of example only, in the illustrated embodiment of FIGS. 5-6, the flexible tubule base 28 has an air-vent-diameter-to-tubule-wall-thickness ratio of 2:1, and the control valve seat 11 has an air-vent-diameter-to-tubule-wall-thickness ratio of 10:1.

Design Principle #3

Design Principle #3 contemplates forming the flexible tubule 10 with a free length that is substantially greater than the thickness of the flexible tubule sidewall 33. According to Design Principle #1, the maximum sidewall thickness will be at the flexible tubule base 28. By way of example only, in the illustrated embodiment of FIGS. 5-6, the tubule-free-length-to-maximum-tubule-wall-thickness ratio is 3:1 at the flexible tubule base 28. The minimum sidewall thickness will typically be at the control valve seat 11 where the flexible tubule inner bore 30 is penetrated by the control valve plunger 22. By way of example only, in the illustrated embodiment of FIGS. 5-6, the tubule-free-length-to-minimum-tubule-wall-thickness ratio is 12:1 at the control valve seat 11.

Design Principle #4

Design Principle #4 contemplates forming the flexible tubule 10 and the control valve plunger 22 so as to maximize the degree of interference fit without longitudinally distorting the flexible tubule during plunger insertion, and with recognition that although increasing the interference fit improves sealing, it also increases the forces required for plunger insertion. As further discussed below, these forces affect the "stealthiness" of suction apparatus operation. By way of example only, in the illustrated embodiment of FIGS. 5-6, the diameter of the control valve plunger 22 is 8% larger than the diameter of the flexible tubule inner bore 30.

Turning now to FIGS. 11-12, a quick-release suction mounting apparatus is shown according to an alternative embodiment. The alternative apparatus 101 is similar in many respects to the previously-described apparatus 1, particularly in terms of its control valve operation. For ease of understanding, elements of the alternative apparatus 101 that correspond to elements of the apparatus 1 are indicated by the use corresponding reference numbers incremented by 100.

The alternative apparatus 101 differs from the apparatus 1 by virtue of having an alternative anchor member 102 and an alternative object-carrying assembly 103. The alternative anchor member 102 does not have the stem mounting structure 9 of the anchor member 2. Instead of the alternative object-carrying assembly 103 mounting to a stem mounting structure, it mounts to the upper second side 108 of the base seal member 104. In particular, the second side 108 is integrally formed with anchor member mounting projections 134 and that engage corresponding first auxiliary component mounting apertures 135 formed in the first main body 120 of an alternative first auxiliary component 112. An alternative second auxiliary component 113 is slidably mounted to the alternative first auxiliary component 112.

The alternative anchor member 102 has an alternative stem 105 formed entirely as an alternative flexible tubule 110 that extends from the upper second side 108 of the base seal member 104 of the alternative anchor member 102.

The alternative flexible tubule 110 has a flexible tubule sidewall 133 that tapers, but instead of tapering on the outside surface like the flexible tubule sidewall 33, the taper is on the sidewall's inside surface. This results in a flexible tubule inner bore 130 that is cylindrical at its base, but has extended radial outward flaring toward the flexible tubule tip 129 to define an alternative control valve seat 111. The extended flaring of the flexible tubule inner bore 130 helps facilitate entry of the control valve plunger 122 into the flexible tubule inner bore 130.

As in the previous embodiment, the alternative second auxiliary component 113 has a second main body 121 formed with a downwardly-extending alternative control valve plunger 122 that engages the alternative control valve seat 111. The alternative control valve plunger 122 may is formed as a tubular structure that engages the alternative control valve seat 111 with an interference fit, as shown in FIG. 12. The extent of penetration by the control valve plunger 122 into the flexible tubule inner bore 130 is limited by virtue of the second auxiliary component 113 bottoming out on the first auxiliary component 112, as shown in FIG. 12.

The control valve components of the alternative apparatus 101 are designed in accordance with Design Principles #1-4 discussed above. As in the case of the previous embodiment, the material used to form the alternative anchor member 102 is silicone rubber having a durometer hardness of between Shore 20 A-80 A, and more preferably Shore 40 A-60 A.

With respect to Design Principle #1, the thickness of the flexible tubule sidewall 133 in the region of the alternative control valve seat 111 varies due the inside tapering of the alternative flexible tubule 110. At the point of deepest penetration of the alternative control valve plunger 122, the sidewall thickness is 80% of the sidewall thickness at the flexible tubule base 128. At the flexible tubule tip 129, the sidewall thickness is 60% of the sidewall thickness at the flexible tubule base 28.

With respect to Design Principle #2, the flexible tubule base 128 has an air-vent-diameter-to-tubule-wall-thickness ratio of 2.8:1. At the point of deepest penetration of the alternative control valve plunger 122, the air-vent-diameter-to-tubule-wall-thickness ratio is 4:1. At the flexible tubule tip 129, the air-vent-diameter-to-tubule-wall-thickness ratio is 6:1.

With respect to Design Principle #3, the flexible tubule base 128 has a tubule-free-length-to-maximum-tubule-wall-thickness ratio of 2.5:1. The flexible tubule tip 129 has a tubule-free-length-to-minimum-tubule-wall-thickness ratio of 5:1.

With respect to Design Principle #4, the diameter of the control valve plunger 22 is 12.5% larger than the diameter of the flexible tubule inner bore 30 at the point of deepest penetration of the alternative control valve plunger 122.

The alternative apparatus 101 shown in FIGS. 11-12, is designed for holding specific types of objects, namely, laboratory equipment such as test tubes or the like. It will thus be seen that the alternative second auxiliary component 113 is formed with a series of object holding compartments 136 for holding such objects. It will be further seen from FIGS. 11-12, that the overall configuration of the alternative apparatus 101 is that of an elongated structure. The base seal member 104 is formed as a rounded rectangle, with straight sides and circular ends. The alternative object-carrying assembly 103 is has a similar footprint.

Due to this elongated construction, there are two anchor member mounting projections 134 engaging two first auxiliary component mounting apertures 135, one mounting projection/aperture pair on each side of the stem 111. It will be appreciated that additional mounting projection/aperture pairs could be provided as needed. It should also be understood that a mounting arrangement between the alternative first auxiliary component 112 and the stem 111 could likewise be provided, either in addition to or in lieu of the mounting projection/aperture pairs. It will also be appreciated that other types of mounting arrangements could be used to attach the alternative first auxiliary component 112 to the alternative anchor member 102, including but not limited to discrete fasteners, connectors or retainers, and/or other attachment modalities, such as adhesive bonding.

Accordingly, embodiments of a quick-release suction mounting apparatus have been shown and described. The disclosed embodiments have many applications and use cases. For example, such embodiments could be used as holders for a variety of articles where dynamic lateral or rotational forces are expected, and there is a need for fast, reliable attachment and detachment that is preferably "stealthy" in nature. As used herein, the term stealthy refers an operational mode wherein the user of the apparatus does not need to consciously lock or unlock the apparatus in order to attach or detach it from a mounting surface. The disclosed embodiments provide stealthy operation because the user only needs to place the apparatus on a surface in order to attach it with a suction seal, and only needs to lift the apparatus from the surface in order to detach it. While attached, however, the apparatus will withstand lateral and rotational forces by maintaining its suction seal due to its control valve plunger and control valve seat components remaining in mutual sealing engagement with each other.

Particular example applications for the disclosed embodiments include handheld utensils, handheld electronic devices, scientific equipment, interactive toys and novelties, and other items that can benefit from a temporary yet secure attachment to surfaces such as desktops, shelves, or car dashboards. These items are often designed to be tapped or impacted, causing lateral stresses that could compromise a traditional suction attachment.

In kitchen settings, a quick-release suction mounting apparatus as disclosed herein can be employed to secure mixing bowls and other kitchenware to countertops or other work surfaces. Traditional mixing bowls can often slip or move during vigorous stirring or whisking. To counteract this issue, the disclosed apparatus can be affixed to the base of a mixing bowl, providing a firm grip on the working surface. The suction control valve seat's lateral compliance ensures that the bowl remains securely mounted despite the lateral forces applied during mixing. When the user wishes to lift the bowl, the simple act of raising the slidable second auxiliary component disengages the suction, allowing for the bowl to be lifted without substantial force-thus bringing both stability during use and ease of removal when the task is complete. A quick-release suction mounting apparatus as disclosed herein allows for a movable mounting solution that remains fastened under such dynamic conditions. The interference fit between the disclosed control valve plunger and control valve seat components ensures that the integrity of the suction is maintained despite lateral and rotational forces, while the "stealthy" quick-release feature allows the user to reposition or remove the apparatus with ease and minimal effort.

For portable device holders, such as smartphone or tablet stands, a quick-release suction mounting apparatus as disclosed herein can be utilized to adhere these stands to various surfaces, including an inclined automobile dashboard, an airline tray table, a table, tray or other surface onboard an aquatic vessel, a window, or an office desk. The disclosed apparatus may include features that allow for orientation adjustments of the device. Even as the angle of the device is adjusted or if the stand is jostled, the laterally compliant yet longitudinally stable nature of the control valve seat allows for the suction hold to maintain its integrity. The stealthy nature of the quick-release mechanism is particularly advantageous in scenarios such as driving, where the user can quickly and quietly remove the device from the mount without distraction.

A quick-release suction mounting apparatus as disclosed herein also finds applications in novelty items like bobblehead toys or other interactive devices that require a temporary yet secure attachment to surfaces such as desktops, shelves, or car dashboards. These items are often designed to be tapped or impacted, causing lateral stress that could compromise a traditional suction attachment. However, the invention allows for a movable mounting solution that remains fastened under such dynamic conditions. The control valve plunger's interference fit with the control valve seat ensures that the integrity of the suction is maintained despite lateral force, while the "stealthy" quick-release feature allows the user to reposition or remove the toy with ease and minimal effort.

The disclosed embodiments may be varied and altered in various ways without departing from the inventive concepts presented herein. For example, the shape of the flexible tubule providing the control valve seat and the shape of the rigid structure providing the control valve plunger can be varied within the premise of maintaining the function of creating an interference fit for suction control. The concepts could extend to different materials for the anchor member or object-carrying assembly, provided they meet the necessary requirements for flexibility, resilience, and rigidity, respectively. The design could also adapt to different surface geometries or weights of objects to be mounted, with appropriate scaling of the anchor member size or alteration in the material durometer to ensure a robust, operationally stealthy suction attachment and release.

The invention claimed is:

1. A quick-release suction mounting apparatus, comprising:
   an anchor member made from a resilient non-porous material forming a unitary molded article with a base seal member, a stem and a suction port that is opened and closed by a control valve;
   the base seal member comprising a first side for adherence to a mounting surface and a second side from which the stem emerges;
   the suction port comprising an air vent extending through the anchor member from a free end of the stem to the first side of the base seal member;
   the control valve including a control valve seat defined at the free end of the stem, the control valve seat being formed by a flexible tubule having a base, a distal tip, and an inner bore providing a free end portion of the suction port;
   an object-carrying assembly including a first auxiliary component affixed to the anchor member and a second auxiliary component arranged for linear sliding relative to the first auxiliary component;
   the control valve further including a control valve plunger on the second auxiliary component configured for releasable sealable engagement with the control valve seat wherein the control valve plunger penetrates into the flexible tubule's inner bore with an interference fit to block the air vent and thereby create a suction seal between the first side of the base seal member and the mounting surface;
   the flexible tubule having longitudinal stability sufficient to resist collapse, sagging and other longitudinal deformations that would, if present, prevent the control valve plunger from penetrating with the interference fit into the flexible tubule's inner bore; and
   the flexible tubule having lateral compliance sufficient to accommodate lateral movement of the control valve plunger and maintain the suction seal under lateral forces acting on the second auxiliary component without air leakage past the control valve plunger when it penetrates into the flexible tubule's inner bore.

2. The quick-release suction mounting apparatus of claim 1, wherein the flexible tubule has a sidewall thickness that decreases from the base to the distal tip of the flexible tubule such that the base of the flexible tubule is more rigid than the free end of the flexible tubule.

3. The quick-release suction mounting apparatus of claim 2, wherein the flexible tubule has a sidewall thickness that tapers from the base to the distal tip of the flexible tubule, with the taper being achieved by tapering the outside surface, the inside surface, or both surfaces of the sidewall.

4. The quick-release suction mounting apparatus of claim 2, wherein the thinnest part of the flexible tubule's sidewall is in a control valve plunger engagement region where the flexible tubule's inner bore is penetrated with the interference fit by the control valve plunger.

5. The quick-release suction mounting apparatus of claim 4, wherein the thickness of the flexible tubule's sidewall in the control valve plunger engagement region is between 25-80% of the flexible tubule's sidewall thickness at the base of the flexible tubule.

6. The quick-release suction mounting apparatus of claim 4, wherein the flexible tubule has an inner-bore-diameter-to-tubule-wall-thickness ratio of between 4:1 and 10:1 in the control valve plunger engagement region.

7. The quick-release suction mounting apparatus of claim 2, wherein the flexible tubule has a tubule-free-length-to-maximum-tubule-wall-thickness ratio of between 2.5:1 and 3:1.

8. The quick-release suction mounting apparatus of claim 2, wherein the flexible tubule has a tubule-free-length-to-minimum-tubule-wall-thickness ratio of between 5:1 and 12:1.

9. The quick-release suction mounting apparatus of claim 2, wherein the control valve plunger penetrates with the interference fit into the flexible tubule a maximum interference distance that is achievable without longitudinally distorting the flexible tubule.

10. The quick-release suction mounting apparatus of claim 9, wherein the interference fit is at least 8%.

11. The quick-release suction mounting apparatus of claim 1, wherein the flexible tubule extends the entire length of the stem.

12. The quick-release suction mounting apparatus of claim 1, wherein the first auxiliary component is mounted to the anchor member stem.

13. The quick-release suction mounting apparatus of claim 1, wherein the first auxiliary component is mounted to the second side of the base seal member outboard of the stem.

14. A quick-release suction mounting apparatus, comprising:
   an anchor member made from a resilient non-porous material forming a unitary molded article with a base seal member, a stem and a suction port that is opened and closed by a control valve;
   the base seal member comprising a first side for adherence to a mounting surface and a second side from which the stem emerges;
   the suction port comprising an air vent extending through the anchor member from a free end of the stem to the first side of the base seal member;
   the control valve including a control valve seat defined at the free end of the stem, the control valve seat being formed by a flexible tubule having a base, a distal tip, and an inner bore providing a free end portion of the suction port;
   an object-carrying assembly including a first auxiliary component affixed to the anchor member and a second auxiliary component arranged for linear sliding relative to the first auxiliary component;
   the control valve further including a control valve plunger on the second auxiliary component configured for releasable sealable engagement with the control valve seat wherein the control valve plunger penetrates into the flexible tubule's inner bore with an interference fit to block the air vent and thereby create a suction seal between the first side of the base seal member and the mounting surface;
   the control valve seat representing a region of the flexible tubule inner bore that is engaged by the control valve plunger;
   the flexible tubule having a sidewall thickness that decreases from the base to the distal tip of the flexible tubule such that the base of the flexible tubule is more rigid than the free end of the flexible tubule;
   the flexible tubule having longitudinal stability sufficient to resist collapse, sagging and other longitudinal deformations that would, if present, prevent the control valve plunger from penetrating with the interference fit into the flexible tubule's inner bore; and the flexible tubule having lateral compliance sufficient to accommodate lateral movement of the control valve plunger and maintain the suction seal under lateral forces acting on the second auxiliary component without air leakage past the control valve plunger when it penetrates into the flexible tubule's inner bore.

15. The quick-release suction mounting apparatus of claim 14, wherein the thickness of the flexible tubule's sidewall in a control valve plunger engagement region is between 25-80% of the flexible tubule's sidewall thickness at the base of the flexible tubule.

16. The quick-release suction mounting apparatus of claim 15, wherein the flexible tubule has an inner-bore-diameter-to-tubule-wall-thickness ratio of between 4:1 and 10:1 in the control valve plunger engagement region.

17. The quick-release suction mounting apparatus of claim 14, wherein the flexible tubule has a tubule-free-length-to-maximum-tubule-wall-thickness ratio of between 2.5:1 and 3:1, and a tubule-free-length-to-minimum-tubule-wall-thickness ratio of between 5:1 and 12:1.

18. The quick-release suction mounting apparatus of claim 14, wherein the control valve plunger penetrates with the interference fit into the flexible tubule a maximum interference distance that is achievable without longitudinally distorting the flexible tubule.

19. The quick-release suction mounting apparatus of claim 14, wherein the interference fit is at least 8%.

20. A method of operating the quick-release suction apparatus of claim 1, comprising:

placing the suction apparatus on the mounting surface;

forming a seal between the base seal member and the mounting surface by ensuring that the control valve plunger is in interfering sealing engagement with the control valve seat to block air flow through the suction port;

applying a force that causes the second auxiliary component to translate or rotate relative to the base seal member and thereby laterally deform the flexible tubule in the region of the control valve seat; and the flexible tubule maintaining its interfering sealing engagement with the control valve seat while laterally deforming in order to continue blocking the air flow through the suction port, whereby the seal between the base seal member and the mounting surface is maintained.

* * * * *